US005795652A

United States Patent [19]

Bell et al.

[11] Patent Number: 5,795,652

[45] Date of Patent: Aug. 18, 1998

[54] FUEL RESISTANT CABLES

[75] Inventors: James Bell, San Mateo; Steven C. Zingheim, Palo Alto, both of Calif.

[73] Assignee: Raychem Corporation, Menlo Park, Calif.

[21] Appl. No.: 761,250

[22] Filed: Dec. 6, 1996

[51] Int. Cl.$^6$ .......................... B32B 27/00; H02G 15/20; B05D 5/12

[52] U.S. Cl. .......................... 428/383; 428/378; 428/379; 174/23 C; 174/113 R; 174/110 N; 174/120 SR; 427/117; 427/118

[58] Field of Search .................................... 428/375, 379, 428/383, 378; 174/236, 113 R, 120 SR, 110 N; 427/117, 118

[56] References Cited

U.S. PATENT DOCUMENTS

| | | | |
|---|---|---|---|
| 3,589,121 | 6/1971 | Malvey | 57/162 |
| 4,152,538 | 5/1979 | Gassinger et al. . | |
| 4,868,054 | 9/1989 | Kartheiser . | |
| 5,151,143 | 9/1992 | Downie | 156/48 |
| 5,213,644 | 5/1993 | Phillips et al. . | |
| 5,271,081 | 12/1993 | Khalil . | |
| 5,460,862 | 10/1995 | Roller . | |

FOREIGN PATENT DOCUMENTS

| | | | |
|---|---|---|---|
| 2008229 | 7/1990 | Canada | H01B 13/00 |

*Primary Examiner*—Marion E. McCamish
*Assistant Examiner*—J. M. Gray
*Attorney, Agent, or Firm*—Timothy H. P. Richardson; Herbert G. Burkard

[57] ABSTRACT

Insulated electrical cables which are suitable for use in gasoline fuel tanks comprise a stranded conductor which is blocked by a polysulfide and is covered by polyamide insulation.

14 Claims, 1 Drawing Sheet

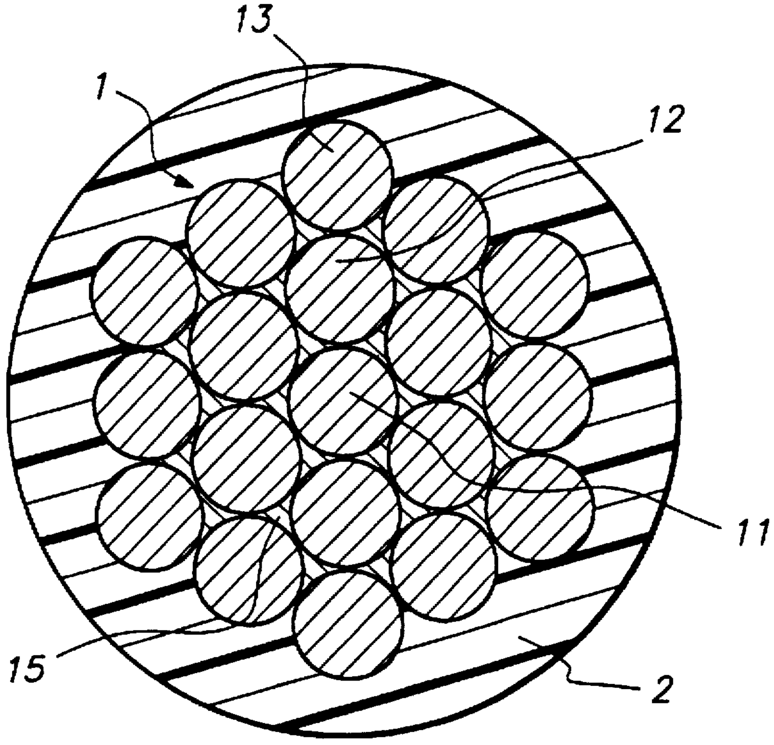
13
1
12
11
15
2

FUEL RESISTANT CABLES

BACKGROUND OF THE INVENTION

1. Field of the Invention This invention relates to cables suitable for use in gasoline fuel tanks.

2. Introduction to the Invention

It is necessary to employ insulated electrical cables inside gasoline fuel tanks, in order to power the fuel pump and/or to transmit signals from the fuel level sensor. If the cable passes through a wall of the gas tank, it must be possible to provide a fuel-tight seal between the exterior of the cable and the wall of the gasoline tank. Furthermore, if a stranded conductor is used (as is preferred because of the greater flexibility and flex durability of stranded conductors), it is necessary to ensure that when gasoline penetrates the exterior insulation of the cable, it cannot travel through the cable and into the electrical connections of the cable or into the atmosphere, for example in contravention of EPA requirements. Existing cables do not fully satisfy these stringent demands.

SUMMARY OF THE INVENTION

We have discovered that a cable which gives excellent results when used in a gasoline fuel tank comprises a stranded conductor which is blocked by a polysulfide and is covered by polyamide insulation, or other insulation which will bond well in the overmolding process which is used to seal the cable as it passes through the wall of the gas tank.

In a first preferred aspect, this invention provides an insulating cable which is suitable for use in gasoline fuel tanks and which comprises (1) a conductive core which comprises
  (a) a plurality of elongate conductors, and
  (b) a solid, polymeric blocking material which fills the interstices between the conductors, at least 50% by weight of the blocking material being a polysulfide; and
(2) a polymeric insulating jacket which surrounds the core and is in intimate contact with the core so that gasoline cannot travel along the core, at least the outer surface of said insulating jacket being composed of an insulating material comprising at least 50% by weight of a polyamide.

In a second preferred aspect, this invention provides a method of making an insulated cable according to the first aspect of the invention, the method comprising (A) preparing a conductive core which comprises (i) a plurality of conductors, and (ii) a curable liquid polysulfide material which contains at least 50% by weight of a curable polysulfide and which fills interstices between the conductors;
(B) curing the liquid polysulfide material; and
(C) melt extruding a polymeric insulating material around the conductive core, at least 50% by weight of the polymeric insulating material being composed of a polyamide.

Step (B) is preferably carried out before step (C), but can be carried out after step (C).

A BRIEF DESCRIPTION OF THE DRAWING

The invention is illustrated in the accompanying drawing, in which the Figure is a cross-section through a cable of the invention.

DETAILED DESCRIPTION OF THE INVENTION

Parts and percentages given in this specification are by weight.

The Stranded Wire

The stranded wire used in this invention can be of conventional construction, e.g. a concentric stranded wire or a bunched stranded wire. The wire can for example comprise (1) a single layer of six conductors wrapped around a central conductor, e.g. (a) a 14 AWG stranded tin-coated copper wire composed of seven 22 AWG conductors each 0.0253 inch in diameter, or (b) a 20 AWG stranded tin-coated copper wire composed of seven 28 AWG conductors each 0.0135 inch in diameter; or (2) an inner layer of six conductors wrapped around a central conductor and an outer layer of twelve conductors wrapped around the inner layer, or (3) an inner layer of six conductors wrapped around a central conductor, an intermediate layer of twelve conductors, and an outer layer of 18 conductors; or (4) a bunched stranded wire of 6 to 30 conductors.

Blocking Materials

The blocking materials which are present in the cables of this invention contain at least 50%, preferably at least 70%, of a solid polysulfide. A single polysulfide, or a mixture of polysulfides can be used. Preferably, the polysulfide consists essentially of 90 to 100% of repeating units of the formula $$—R_1—O—R_2—O—R_1—S—S—$$

where each of $R_1$ and $R_2$, which can be the same or different, is an aliphatic, e.g. an alkylene radical, preferably an alkylene radical containing 1 to 4 carbon atoms, and 0 to 10%, e.g. 1 to 5% of units which are at least trivalent (i.e. have a valency of 3 or more) and serve as crosslinking sites. Preferably the polysulfide is the sole polymer in the blocking material. The blocking material can contain conventional non-polymeric materials, e.g. fillers, antioxidants, the residues of the curing system for the polysulfide, and unreacted parts of the curing system.

The blocking material is prepared by curing a curable liquid polysulfide precursor composition in situ around the conductors. Such precursors for solid polysulfides are well known, and contain a relatively low molecular weight polysulfide and a curing system therefor. The curing system is usually mixed with the liquid polysulfide shortly before the precursor composition is used. Generally, the curing system is in the form of a masterbatch in which the active ingredients are thoroughly blended with a liquid carrier, e.g. a plasticizer. The active ingredients include a curing agent such as activated manganese oxide, lead peroxide or cumene hydroperoxide and optionally a cure retardant such as calcium or other metal stearate, isostearic acid or a molecular sieve (Zeolite), or a curing activator. The liquid polysulfide preferably contains molecules having the formula $$HS—(—R_1—O—R_2—O—S—S—)_x—R_1—O—R_2—SH$$

where $R_1$ and $R_2$ are as defined above and which optionally contain crosslinking sites. The precursor composition preferably has a viscosity, e.g. 30,000 to 300,000 centistokes, such that it can be metered onto one or more of the conductors before they are combined to form a stranded wire in which the composition fills all the interstices between the conductors. In one preferred embodiment, the conductive core is prepared by a process which comprises (a) coating a conductor with the curable polysulfide material, and (b) wrapping a plurality of conductors around the coated conductor; when a concentric stranded wire having two layers of conductors is needed, the process preferably includes (c) coating the product of step (b) with a curable liquid polysulfide material which contains at least 50% by weight of the curable liquid polysulfide material; and (d) wrapping a plurality of conductors around the product of step (c).

The polysulfide precursor compositions are preferably cured before the application of the insulating jacket. The precursor compositions may cure satisfactorily at room temperature, but the cure times are often longer than is desirable, in which case the product may be heated, e.g. to a temperature of 80° to 120° C., to accelerate the curing process.

The Insulating Jacket

The insulating jacket is preferably composed of a single layer of insulating material, e.g. 0.005 to 0.03 inch thick, preferably 0.007 to 0.020 inch thick. However, it can comprise two or more layers, each for example 0.005 to 0.03 inch thick. The single layer, or the outer layer if there is more than one layer, should be composed of a polymeric material which will seal well in the overmolding process which is used to seal the cable as it passes through the wall of the gas tank. A polyamide grommet is often used in such overmolding processes, in which case at least the outer surface of the insulating jacket is preferably composed of an insulating material comprising at least 50%, particularly at least 70%, of a polyamide. The polyamide, which is preferably the sole polymer in the insulating material, preferably comprises at least 50%, particularly at least 80%, of repeating units having the formula $$-(CH_2)_{11}-CO.NH-$$

i.e. the homopolymer (polylaurolactam or nylon-12) or a copolymer in which the major component is derived from laurolactam.

Referring now to the drawing, the Figure is a cross section through a blocked cable of the invention. The cable includes a central conductive core 1 composed of a central conductor 11, an intermediate layer of six intermediate conductors 12, and an outer layer of twelve outer conductors 13. The interstices between the conductors are filled with a polysulfide blocking material 15. Surrounding the conductive core 1, there is a pressure melt-extruded insulating jacket 2 which is composed of a polyamide.

The invention is illustrated by the following Examples.

Example 1

A 20 AWG cable of the invention was prepared as follows.

A polysulfide precursor composition was prepared by mixing the following ingredients.

80 parts of a liquid polysulfide in which the repeating units have the formula $$-C_2H_4-O-CH_2-O-C_2H_4-S-S$$

(available from Morton International under the trade name LP977); and 20 parts of a masterbatch curing system containing 9.4 parts activated MnO (i.e. oxygenated MnO), and 1.2 parts of calcium stearate dispersed in 9.4parts texanol benzyl phthalate (available from Monsanto under the trade name Santicizer 278).

A 28 AWG tin-coated copper wire (0.0135 inch in diameter) was passed through a bath of the polysulfide precursor and then through a metering die having a nominal opening 1.5 times the diameter of the wire. Six more 28 AWG tin-coated copper wires were then twisted about the coated wire, and the twisted product was slightly compacted by passing it through a closing die of diameter 0.0385 inch. The product was placed in an oven at 90° C. for 16 hour to cure the polysulfide and produce a blocked, stranded wire.

The blocked wire was then provided with an insulating jacket of the following composition.

83.5 parts nylon-12 (available from EMS under the trade name L20XFR);

8.0 parts brominated aromatic compound (available from W. F. McDonald, under the trade name Saytex 8010);

5.0 parts antimony oxide;

2.0 parts sodium alumina silicate ($Na_2O.Al_2O_3.SiO_2$), available from Altair Gas and Equipment under the trade name Linde 13X Molecular Sieve MS 1333;

0.9 part hindered phenol antioxidant (available from Ciba Geigy under the trade name Irganox 1010); and 0.6 part thiodipropionate ester (available from W. F. McDonald under the trade name Cyanox 1212)

The above composition was pressure-extruded at a melt temperature of about 220° C. around the blocked wire, which had been preheated to a temperature of about 146° C., to form an insulating jacket about 0.016 inch thick.

Example 2

A 14 AWG cable of the invention was made by following substantially the same procedure as in Example 1 but employing 22 AWG conductors instead of 28 AWG conductors.

What is claimed is:

1. An insulated cable which is suitable for use in gasoline fuel tanks and which comprises (1) a conductive core which comprises (a) a stranded wire composed of a plurality of elongate conductors, and (b) a solid, polymeric blocking material which fills the interstices between the conductors, at least 50% by weight of the blocking material being a polysulfide; and (2) a polymeric insulating jacket which surrounds the core and is in intimate contact with the core so that gasoline cannot travel along the core, at least the outer surface of said insulating jacket being composed of an insulating material comprising at least 50% by weight of a polyamide.

2. An insulated cable according to claim 1 wherein the polysulfide consists essentially of 90 to 100% of repeating units of the formula $$-R_1-O-R_2-O-R_1-S-S-$$

wherein each of $R_1$ and $R_2$, which may be the same or different, is an alkylene radical, and 0 to 10% of units which are at least trivalent and serve as crosslinking sites.

3. An insulated cable according to claim 2 wherein $R_1$ is $-CH_2CH_2-$ and $R_2$ is $-CH_2-$.

4. An insulated cable according to claim 2 wherein the blocking material comprises at least 70% by weight of the polysulfide.

5. An insulated cable according to claim 4 wherein the polysulfide is the sole polymer in the blocking material.

6. An insulated cable according to claim 1 wherein the insulating jacket comprises at least 70% by weight of a polyamide comprising at least 50% by weight of repeating units having the formula $-(CH_2)_{11}-CO.NH-$.

7. An insulated cable according to claim 6 wherein the polyamide contains at least 80% by weight of said repeating units.

8. An insulated cable according to claim 7 wherein the polyamide is polylaurolactam.

9. An insulated cable according to claim 1 wherein the polymeric insulating jacket consists of a single layer of an insulating material comprising at least 60% by weight of a polyamide comprising at least 80% by weight of repeating units having the formula $—(CH_2)_{11}—CO.NH—$.

10. An insulated cable according to claim 9 wherein the layer is 0.007 to 0.020 inch thick.

11. A method of making an insulated cable as defined in claim 1, the method comprising (A) preparing a conductive core which comprises (i) a plurality of conductors, and (ii) a curable liquid polysulfide material which contains at least 50% by weight of a curable polysulfide and which fills interstices between the conductors;

(B) curing the liquid polysulfide material; and (C) melt extruding a polymeric insulating material around the conductive core, at least 50% by weight of the polymeric insulating material being composed of a polyamide.

12. A method according to claim 11 wherein step (B) is carried out before step (C).

13. A method according to claim 11 wherein step (A) comprises (a) coating a conductor with the curable polysulfide material, and (b) wrapping a plurality of conductors around the coated conductor.

14. A method according to claim 13 wherein step (A) comprises the additional steps of (c) coating the product of step (b) with a curable liquid polysulfide material which contains at least 50% by weight of the curable liquid polysulfide material; and (d) wrapping a plurality of conductors around the product of step (c).

* * * * *

UNITED STATES PATENT AND TRADEMARK OFFICE

CERTIFICATE OF CORRECTION

PATENT NO. : 5,795,652

DATED : Bell et al.

INVENTOR(S) : August 18, 1998

It is certified that error appears in the above-identified patent and that said Letters Patent is hereby corrected as shown below:

Title page, left hand column, References Cited [56], U.S. Patent Documents, after "3,589,121 ... 57/162", insert, as two new lines,

| | | | |
|---|---|---|---|
| --3,602,632 | 8/1971 | Ollis | 174/36-- |
| --4,033,800 | 7/1977 | Ollis | 156/48--. |

Cover Page, right hand column, References Cited [56], U.S. Patent Documents, after "4,152,538 ... Gassinger et al.", insert, as two new lines,

| | | | |
|---|---|---|---|
| --4,609,762 | 9/1986 | Morris et al. | 568/38-- |
| --4,623,711 | 11/1986 | Morris et al. | 528/375--. |

Cover Page, right hand column, References Cited [56], Foreign Patent Documents, after "2008229 ... 13/00", insert, as two new lines,

| | | | |
|---|---|---|---|
| --0054379 | 6/1982 | Europe | C08G 75/12-- |
| --2479543 | 10/1981 | France | H01B 7/02--. |

Column 1, line 3, after "Invention" begin a new paragraph with "This".

Column 3, line 54, replace "9.4parts" by --9.4 parts--.

Signed and Sealed this

Twenty-fourth Day of November, 1998

Attest:

BRUCE LEHMAN

*Attesting Officer* *Commissioner of Patents and Trademarks*